(12) United States Patent
De Soccio et al.

(10) Patent No.: US 12,253,130 B2
(45) Date of Patent: Mar. 18, 2025

(54) VEHICLE DISC BRAKE

(71) Applicants: COFREN S.R.L, Avellino (IT); POLI S.R.L, Camisano (IT)

(72) Inventors: Vittorio De Soccio, Avellino (IT); Giuseppe Russo, Avellino (IT); Roberto Boffelli, Camisano (IT)

(73) Assignees: COFREN S.R.L., Avellino (IT); POLI S.R.L., Camisano (IT)

( * ) Notice: Subject to any disclaimer, the term of this patent is extended or adjusted under 35 U.S.C. 154(b) by 364 days.

(21) Appl. No.: 17/715,685

(22) Filed: Apr. 7, 2022

(65) Prior Publication Data
US 2022/0325763 A1 Oct. 13, 2022

(30) Foreign Application Priority Data
Apr. 9, 2021 (IT) .................... 102021000008963

(51) Int. Cl.
| | |
|---|---|
| *F16D 65/12* | (2006.01) |
| *B60T 1/06* | (2006.01) |
| *B60T 5/00* | (2006.01) |
| *B61H 5/00* | (2006.01) |
| *F16D 65/097* | (2006.01) |

(52) U.S. Cl.
CPC ............ *F16D 65/124* (2013.01); *B60T 1/065* (2013.01); *B60T 5/00* (2013.01); *B61H 5/00* (2013.01); *F16D 65/0971* (2013.01)

(58) Field of Classification Search
None
See application file for complete search history.

(56) References Cited

U.S. PATENT DOCUMENTS

| | | | | |
|---|---|---|---|---|
| 3,966,026 | A * | 6/1976 | Fillderman | ......... F16D 65/0006 188/73.1 |
| 4,064,975 | A * | 12/1977 | Fillderman | ........... F16D 69/0408 188/73.1 |
| 4,103,761 | A * | 8/1978 | Fillderman | ........... F16D 69/0408 188/73.37 |
| 4,225,021 | A * | 9/1980 | Kawamura | ......... F16D 65/0006 188/73.37 |
| 5,099,962 | A * | 3/1992 | Furusu | .................. F16D 65/092 188/251 A |
| 5,762,166 | A * | 6/1998 | Yano | .................... F16D 65/0006 188/264 G |

(Continued)

FOREIGN PATENT DOCUMENTS

| | | |
|---|---|---|
| EP | 3569887 A1 | 11/2019 |
| WO | 2006002903 A1 | 1/2006 |

OTHER PUBLICATIONS

Italian Search Report and Opinion for corresponding Italian Application No. 202100008963 (7 pages).

*Primary Examiner* — Melanie Torres Williams
(74) *Attorney, Agent, or Firm* — K&L Gates LLP

(57) ABSTRACT

A pad for disc brakes for railway vehicles includes a base plate, a plurality of friction elements fixed to the base plate, and a plurality of spacers, each of which is mounted between the base plate and a respective friction element. At least one fixing hole is obtained in each one of the spacers, which is engaged by a respective rivet to lock the friction element to the base plate. Each one of the spacers includes a plurality of metal plaques, each having a fixing hole obtained in the plaque. The metal plaques are stacked on top of one another so that the respective fixing holes coincide.

14 Claims, 6 Drawing Sheets

(56) References Cited

U.S. PATENT DOCUMENTS 5,842,546 A * 12/1998 Biswas ................ F16D 65/092
188/73.1
2019/0120307 A1* 4/2019 Schlauss ............. F16D 69/0408

* cited by examiner

VEHICLE DISC BRAKE

CROSS-REFERENCE TO RELATED APPLICATIONS

This patent application claims priority from Italian patent application no. 102021000008963 filed on Apr. 9, 2021, the entire disclosure of which is incorporated herein by reference.

TECHNICAL FIELD

This invention relates to a pad for disc brakes for railway vehicles. In particular, this invention finds advantageous, but not exclusive, application with medium/low-speed railway vehicles.

BACKGROUND ART

As is known, disc brakes are subject to great stress and, in order to obtain optimal braking action, it is necessary to have a good transmission of braking force from pad to disk.

For some time now, the sector has been oriented towards the use of pads comprising multiple friction elements of a smaller size, instead of a single friction element of a larger size.

One of the solutions adopted in this regard, requires that each pad mainly consists of a main base plate and multiple friction elements fixed to the base plate. Generally, each of the friction elements consists of one metal support and a friction insert permanently fixed to the metal support.

One solution, to ensure the correct cooling of the friction elements, is to insert spacers between the metal sheets and the base plate. The presence of the spacers creates a gap between the metal sheets and the base plate so as to favour cooling ventilation on the lower surface of the friction elements.

Each of the spacers has at least one hole that, in the assembled pad, is engaged by a rivet that is also designed to lock the metal support to the base plate.

The solution relating to the use of multiple friction elements of a smaller size is advantageous both in terms of efficacy of pressure on the disk and, thus, of braking, and in terms of low noise. In this regard, it should be highlighted how low noise became an increasingly important discriminating factor in choosing which disc brake to use.

As can be easily imagined, the need to reduce noise during braking is most important for those medium/low-speed trains making a large number of stops, such as metros, regional trains, or intercity trains. In this respect, it should be considered that the braking of medium/low-speed trains causes a noise in the frequency range (1000-4000 Hz) to which the human ear is most sensitive.

Here and below, the term "medium/low-speed trains" means those trains whose maximum speed is 220 km/h.

Many solutions that lead to a reduction in braking noise suffer from the disadvantage of entailing a lower transmission of braking force from the pad to the disk and, therefore, a reduction in the efficiency of the braking itself. In fact, as is obvious, trains that make many stops (medium/low-speed trains), even if they do not reach very high speeds, must, in any case, be able to have a high degree of braking efficiency.

Another particularly crucial requirement relating to brakes adopted on trains that make many stops, concerns the reduction in pollution in terms of fine dust produced during braking. In fact, the trains considered above repeatedly transit through and stop in areas with high population density, such as residential areas. Generally speaking, the solutions leading to a reduction in braking noise suffer from the disadvantage of entailing a high release of fine powders.

Thus, the need was felt to provide a type of disc brake for medium/low-speed trains, the technical features of which were such as to ensure low noise during braking, without, as a result, entailing disadvantages in terms of efficiency of braking and in terms of fine powders produced.

The inventors of this invention have, surprisingly, found that by adjusting the structure of the spacers, it is possible to meet the requirements detailed above.

DISCLOSURE OF INVENTION

The subject of this invention is a pad for disc brakes for railway vehicles, comprising a base plate, multiple friction elements fixed to the base plate, and multiple spacers, each of which is mounted between said base plate and a respective friction element; in each of said spacers, there is at least one fixing hole engaged by a respective rivet that is designed to lock the friction element to the base plate; said pad being characterised in that each of said spacers consists of multiple metal plaques, in each of which there is a fixing hole; said metal plaques are stacked on top of each other, making the respective fixing holes coincide; each of the metal plaques being between 0.1 and 1 mm thick.

Generally speaking, each of the friction elements consists of one metal support and a friction insert permanently fixed to the metal support.

Each of said spacers preferably consists of a number of metal plaques ranging between 2 and 7. In this way, it is possible to balance the effects of its noisiness with the production requirements.

Said metal plaques are preferably made of one of the following materials: iron, copper, or an alloy thereof. More preferably, said metal plaques are made of brass or bronze.

The pad that is the object of this invention is preferably for disc brakes for medium/low-speed railway vehicles.

BRIEF DESCRIPTION OF THE DRAWINGS

For a better understanding of the invention, two embodiments are included below, merely by way of non-limiting example, with the aid of the attached drawings, wherein.

BEST MODE FOR CARRYING OUT THE INVENTION

Figure 1:
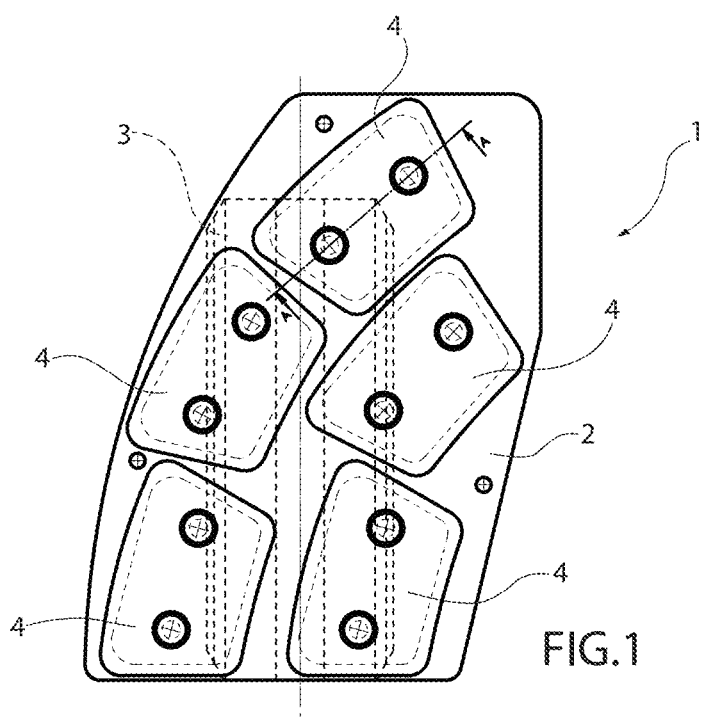
FIG. 1 is a view from above, with transparent parts for clarity, of a first embodiment of the pad that is the object of this invention.

In FIG. 1, the reference number 1 indicates, as a whole, a pad for disc brakes according to this invention.

The pad 1 comprises a base plate 2, a dovetail attachment 3 attached to a rear surface of the base plate 2 and designed to attach the pad 1 itself to a structure of the disc brake and multiple friction elements 4 attached to the base plate 2 and arranged so as to exert pressure on the brake disc to perform the braking action.

For the purposes of this invention, it is irrelevant whether the friction elements 4 may be attached to the plate 2 temporarily or permanently.

Figure 2:
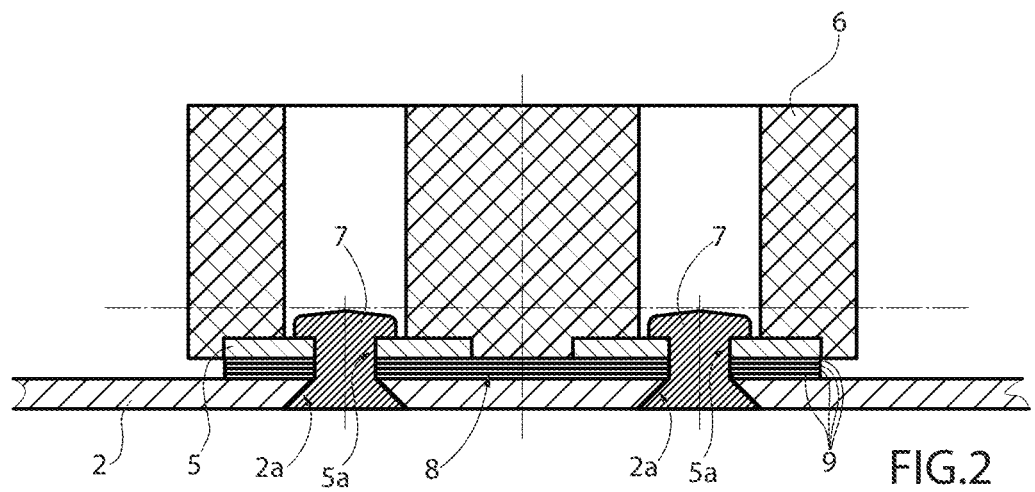
FIG. 2 is a cross-section along the line A-A of FIG. 1.

As is more clearly visible in FIG. 2, each of the friction elements 4 comprises a metal support 5 and a friction insert 6 permanently fixed to the metal support 5.

Each of the friction elements 4 is fixed to the base plate 2 via the action of two rivets 7, each of which passes through a respective fixing hole 5a formed in the metal support 5 and a respective fixing hole 2a made in the base plate 2.

The pad 1 comprises multiple spacers 8, each of which is positioned between a respective metal support 5 and the base plate 2 (FIG. 2). As is clearly visible in FIG. 3, each of the spacers 8 is basically trapezoidal in shape and has two fixing holes 8a, each of which is apt to be engaged by a respective rivet 7. From FIG. 2, it is clear how a single friction element is paired with a single spacer 8.

As illustrated in FIG. 2, each of the spacers 8, consists of four metal plaques 9 of brass stacked on top of each other. Each of the metal plaques 9 has the shape displayed in FIG. 3 and is 0.5 mm thick, thus meaning that the spacer as a whole is 2 mm thick.

The pad described above was subjected to a noise test, according to a chassis dynamometer simulation procedure of a typical trip for a metropolitan vehicle, with no load. The no-load condition mentioned is the most critical in terms of noise.

The test was carried out by applying two different braking conditions, in order to verify whether the advantages could be reproduced by applying different forces.

Figure 3:
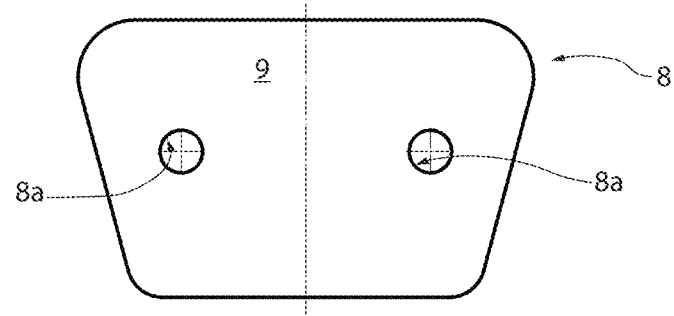
FIG. 3 is a plan view of the spacer of the pad in FIG. 1.

The two tests were repeated in the same conditions with a comparison pad, which only differed from the invention pad due to the fact that the spacers in FIG. 3 are made of a single piece with a thickness of 2 mm.

FIGS. 7-10 display the noise values expressed in decibels produced by the pads as a function of the braking action time. In particular, the noises were selected as a function of the frequencies, respectively, of 1000 Hz, 1250 Hz, 1600 Hz, 2000 Hz, 2500 Hz, 3150 Hz, and 4000 Hz. In this way, the frequencies to which the human ear is most sensitive were measured.

Figure 7:
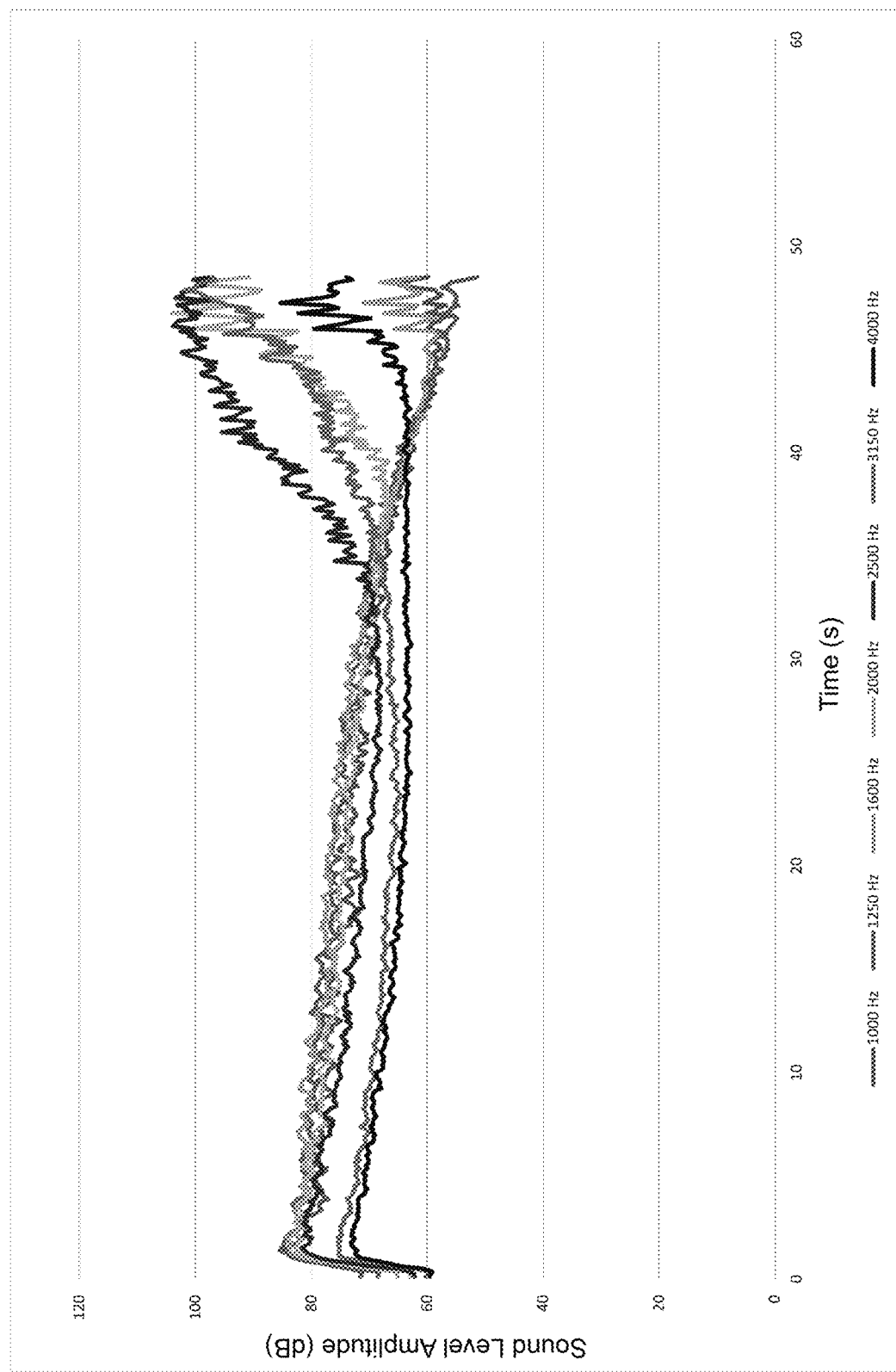
FIG. 7 is a graph of the noise measurement of the pad in FIG. 1 in a first braking condition.
Figure 8:
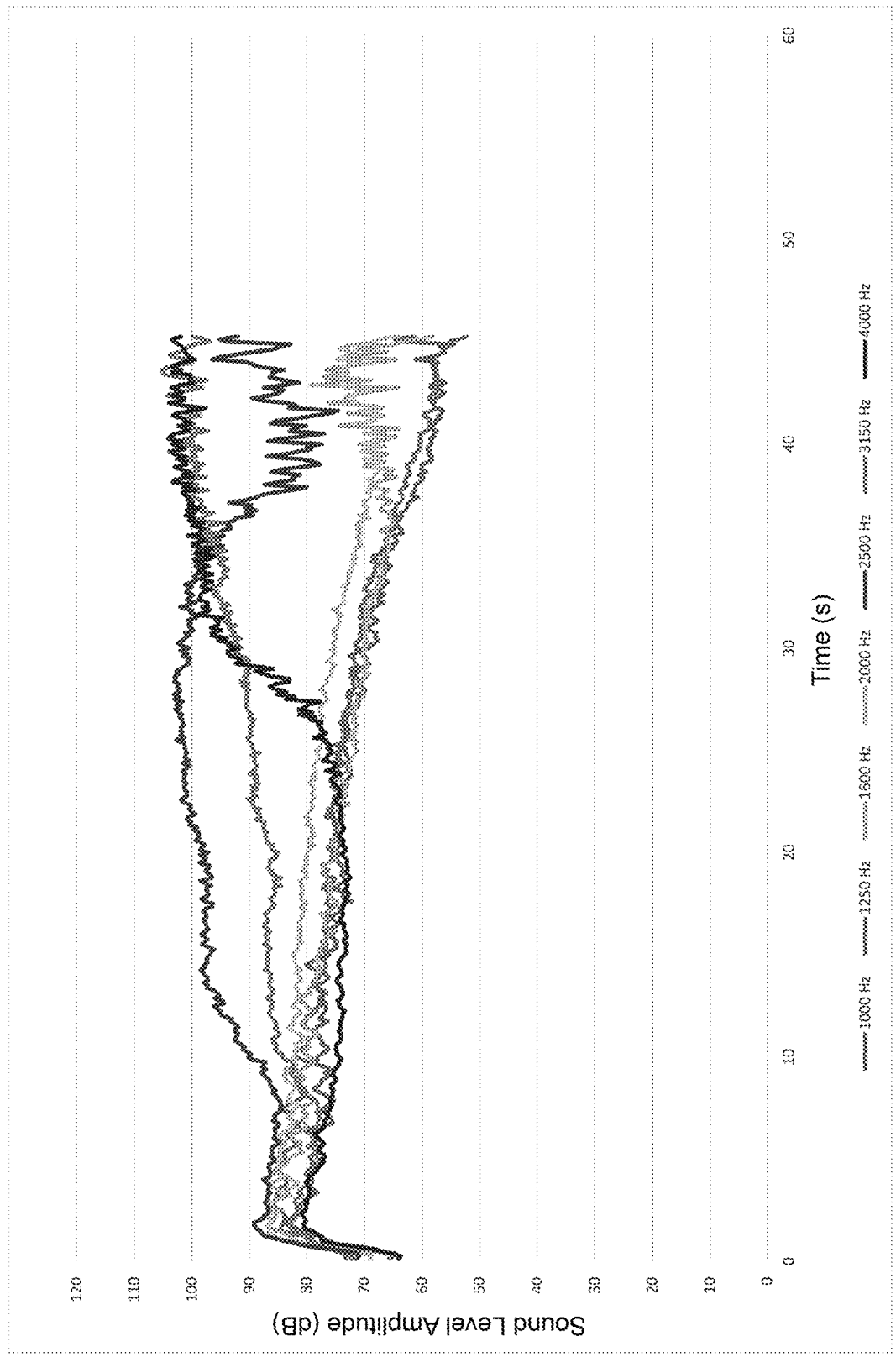
FIG. 8 is a graph of the noise measurement of a comparison pad according to the operating conditions in FIG. 7.
Figure 9:
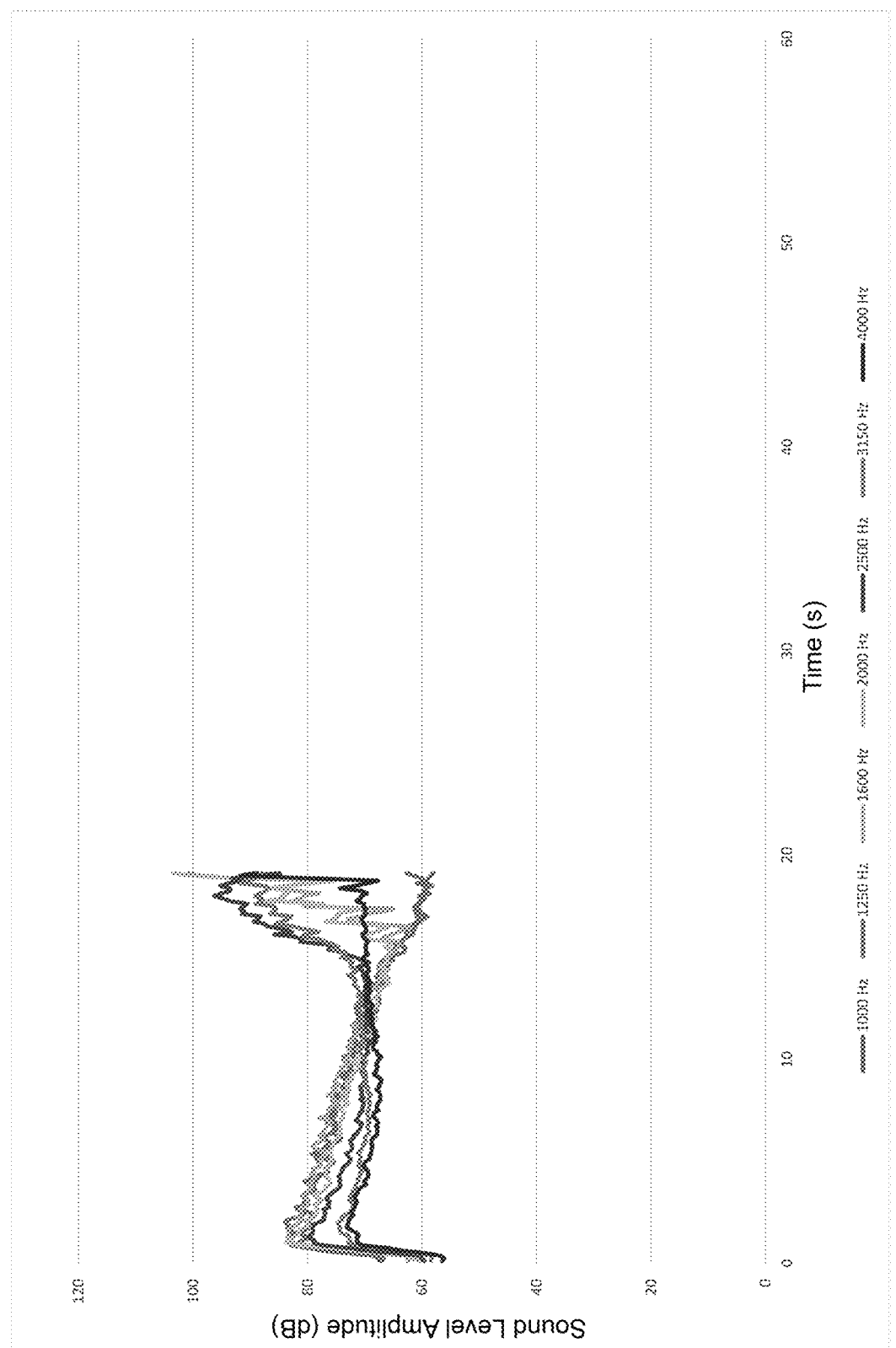
FIG. 9 is a graph of the noise measurement of the pad in FIG. 1 in a second braking condition.
Figure 10:
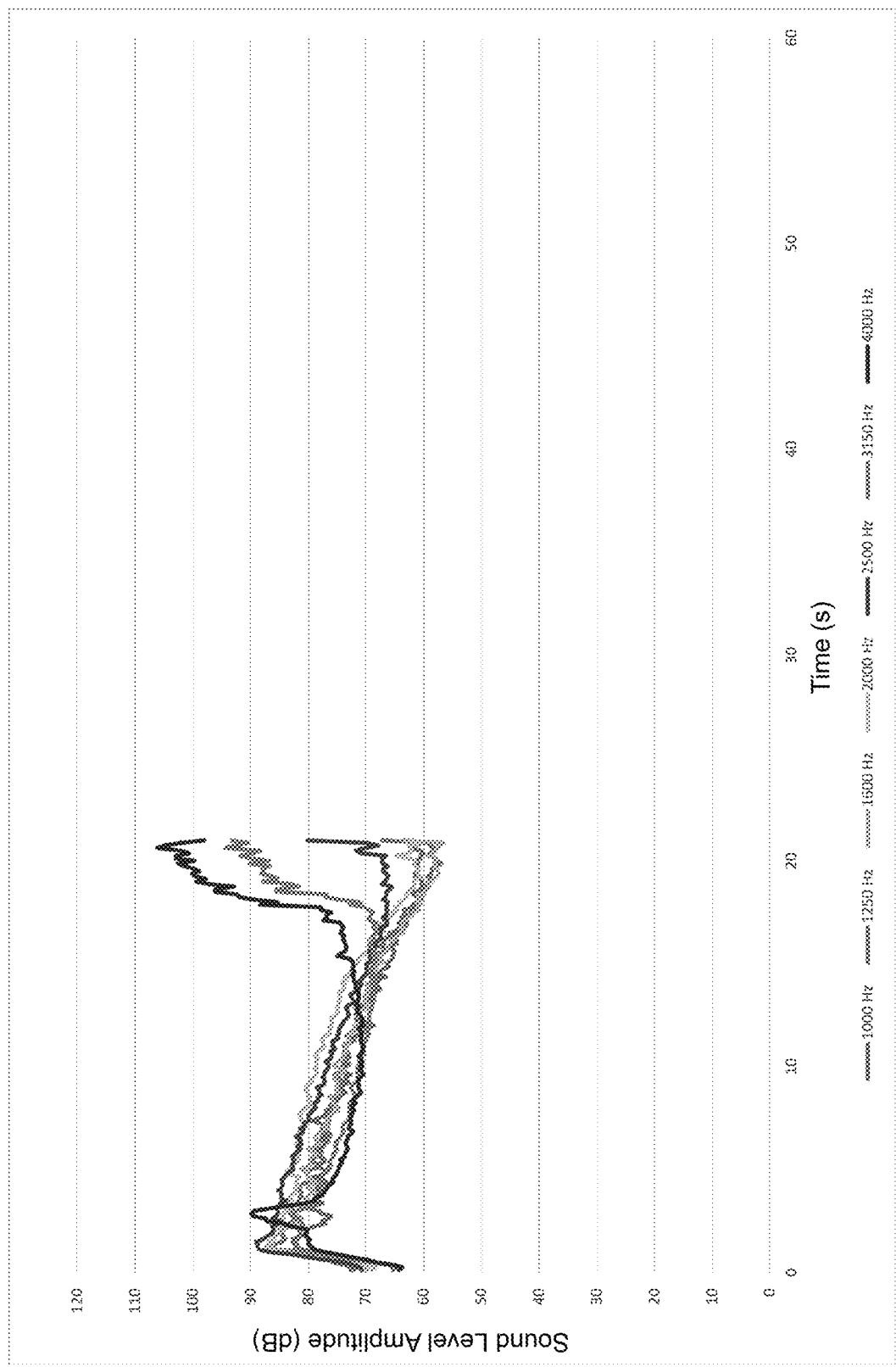
FIG. 10 is a graph of the noise measurement of a comparison pad according to the operating conditions in FIG. 9.

The graph in FIGS. 7 and 8 relate to braking noise measurements made by applying a force of 15 KN; while the graphs in FIGS. 9 and 10 relate to braking noise measurements made by applying a force of 36 KN.

The graph in FIG. 7 (measurements with the invention pad—application force of 15 KN) shows that the noise relating to the frequencies considered is practically kept below 80 decibels for the first 40 seconds from the start of the braking action before rising, but only for certain frequencies, up to 100 decibels in the subsequent 10 seconds. On the other hand, the graph in FIG. 8 (measurements with the comparison pad—application force of 15 KN) shows how the noise relating to some of the frequencies considered reaches values around 100 decibels already after just 10 seconds, before increasing further in the remaining 40 seconds.

The graph in FIG. 9 (measurements with the invention pad—application force of 36 KN) shows that the noise relating to the frequencies considered is basically kept constant and around 80-70 decibels up to 15 seconds after the start of the braking action, before increasing in the subsequent 5 seconds without reaching 100 decibels. On the other hand, the graph in FIG. 10 (comparison pad—application force of 36 KN) shows how the noise relating to some of the frequencies considered reaches values around 90 decibels immediately after the start of the braking action, before increasing in the last 5 seconds up to values above 100 decibels.

To summarise, from a comparison of the graphs in FIGS. 7 and 8 and the graphs in FIGS. 9 and 10, it is clearly seen how the pad of this invention produces less noise than the comparison pads.

Figure 4:
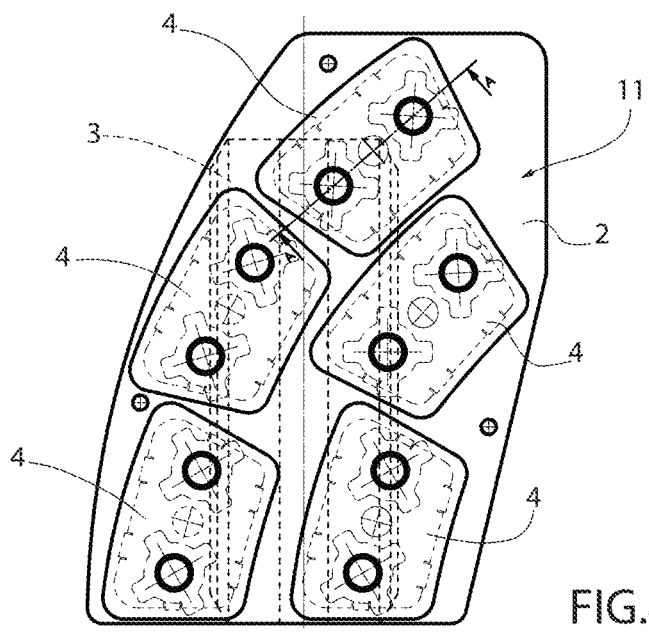
FIG. 4 is a view from above, with transparent parts for clarity, of a second embodiment of the pad that is the object of this invention.

In FIG. 4, the reference number 11 indicates, as a whole, a pad for disc brakes according to an additional embodiment of this invention.

The parts of the second pad 11, which are the same as those of the first pad 1, will be designated with the same numbering and will not be described again.

The second pad 11 only differs from the first pad 1 in relation to the spacers used.

In fact, while in the first pad 1 a single spacer 8 is paired with each friction element 4, in the second pad 11, a pair of spacers 12 (FIGS. 4 and 5) is paired with each friction element 4.

Figure 6:
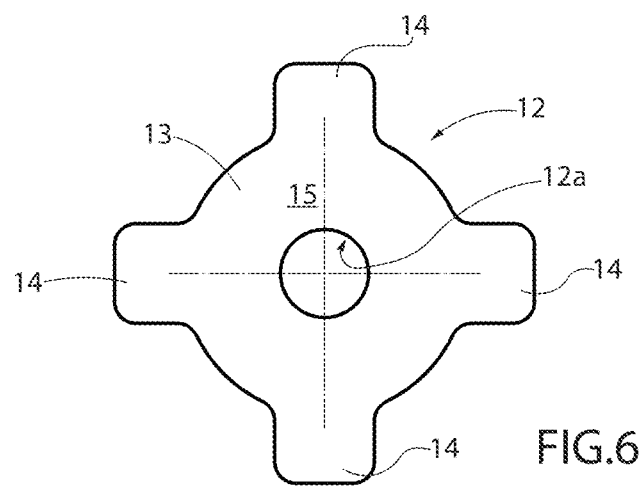
FIG. 6 is a plan view of the spacer of the pad in FIG. 4.

As is clearly shown in FIG. 6, in each of the spacers 12, there is a single fixing hole 12a, which is designed to be engaged by a respective rivet 7. Each of the spacers 12 comprises a central, circular portion 13, in which the fixing hole 12a is formed, four arms 14 extending in a cross from the central portion 13.

Figure 5:
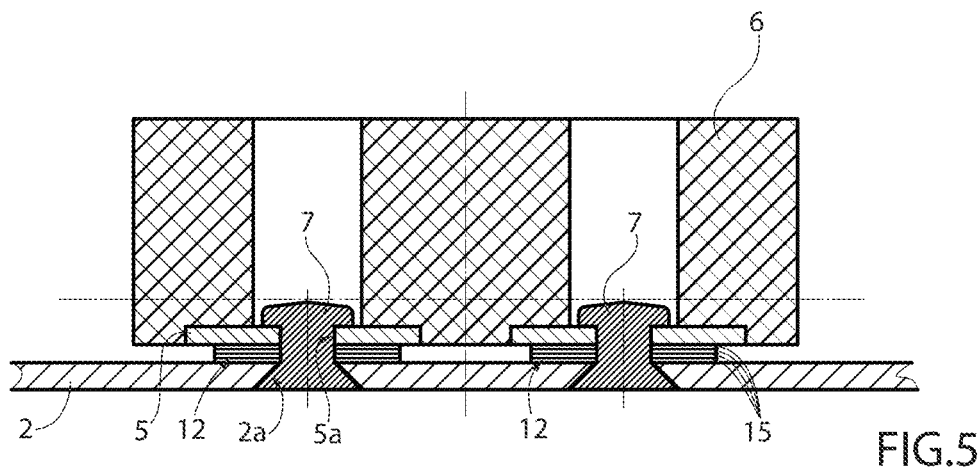
FIG. 5 is a lateral cross-section along the line A-A of FIG. 4.

As illustrated in FIG. 5, each of the spacers 12 consists of four metal plaques 15 of brass that have the same shape and are stacked on top of each other. Each of the metal plaques 15 is 0.5 mm thick, thus meaning that the spacer as a whole is 2 mm thick.

The second pad 11 was subject to the same noise tests described above. The results obtained were compared with the same tests carried out using a comparison pad, which only differs from the second pad 11 due to the fact that it uses spacers of the same shape as the spacers 12 but made of a single piece, which is 2 mm thick. The results obtained were basically the same as those presented in FIGS. 7-10, thus confirming that the replacement of a spacer made of a single piece with a spacer made with multiple stacked plaques entails a significant decrease in the noise produced during braking.

As may seem clear to a person skilled in the art, the solution relating to this invention cannot technically entail a decrease neither in terms of braking efficacy nor in terms of fine dust produced.

To summarise, this invention consists of pads for disc brakes comprising spacers consisting of multiple metal plaques stacked on top of each other. In this way, it was, surprisingly, found that there was a reduction in noise produced during braking, without, for this reason, reducing the efficacy of the braking or increasing the production of fine dust.

The invention claimed is:

1. A pad for disc brakes comprising:
   a base plate;
   a plurality of friction elements fixed to the base plate; and
   a plurality of spacers, each of the spacers mounted between the base plate and a respective friction element of the friction elements, each of the spacers including at least a first fixing hole configured to be engaged by a rivet to lock the respective friction element to the base plate, each of the spacers including a plurality of metal plaques, each of the metal plaques having a second fixing hole, the metal plaques stacked on top of one another so that the second fixing holes coincide with each other, each of the metal plaques between 0.1 and 1 millimeter (mm) thick, wherein each of the spacers is trapezoidal in shape.

2. The pad of claim 1, wherein each of the spacers includes between two and seven of the metal plaques.

3. The pad of claim 1, wherein the metal plaques are made of one or more of iron, copper, or an alloy thereof.

4. The pad of claim 1, wherein the metal plaques are made of one or more of brass or bronze.

5. The pad of claim 1, wherein each of the friction elements is associated with a single one of the spacers.

6. The pad of claim 1, wherein each of the friction elements is associated with a pair of the spacers.

7. The pad of claim 1, wherein the pad is configured for use in a disc brake for a medium or low speed railway vehicle.

8. A disc brake pad comprising:

a base plate;

friction elements fixed to the base plate; and spacers mounted between the base plate and the friction elements, the spacers including first fixing holes positioned to be engaged by a rivet, the spacers including plaques having second fixing holes, the plaques stacked on top of one another with the second fixing holes aligned with each other, wherein each of the spacers is trapezoidal in shape.

9. The disc brake pad of claim 8, wherein each of the plaques is between 0.1 and 1 millimeter (mm) thick.

10. The disc brake pad of claim 8, wherein each of the spacers includes between two and seven of the plaques.

11. The disc brake pad of claim 8, wherein the plaques include one or more of iron, copper, brass, or bronze.

12. The disc brake pad of claim 8, wherein each of the friction elements is associated with a single one of the spacers.

13. The disc brake pad of claim 8, wherein each of the friction elements is associated with at least a pair of the spacers.

14. The disc brake pad of claim 8, wherein the disc brake pad is configured for use in a railway vehicle.

* * * * *